United States Patent [19]

Schmidt

[11] Patent Number: 4,842,469
[45] Date of Patent: Jun. 27, 1989

[54] DEVICE FOR APPLYING A VISCOUS SEALANT IN ANNULAR FORM ONTO A SUBSTANTIALLY FLAT SURFACE, SPECIFICALLY TO A CAN END

[75] Inventor: Gunter H. R. Schmidt, Neuwied, Fed. Rep. of Germany

[73] Assignee: The Broken Hill Proprietary Company Limited, Victoria, Australia

[21] Appl. No.: 121,639

[22] Filed: Nov. 16, 1987

[30] Foreign Application Priority Data

Nov. 18, 1986 [DE] Fed. Rep. of Germany ....... 3639427

[51] Int. Cl.$^4$ ............................................. B21D 51/46
[52] U.S. Cl. .................................. 413/60; 413/18; 413/19; 413/58; 118/50; 118/410
[58] Field of Search ............................. 413/15, 17–19, 413/58, 60, 67; 118/50, 410

[56] References Cited

U.S. PATENT DOCUMENTS

| | | | |
|---|---|---|---|
| 2,766,484 | 10/1956 | Sanderson | 118/410 |
| 3,981,652 | 9/1976 | Lovell et al. | 413/18 |
| 3,999,494 | 12/1976 | Miyamatsu et al. | 413/18 |
| 4,102,304 | 7/1978 | Debenham | 413/19 |
| 4,340,621 | 7/1982 | Matsomiga et al. | 118/50 |

*Primary Examiner*—Frederick R. Schmidt
*Assistant Examiner*—Robert Showalter
*Attorney, Agent, or Firm*—Armstrong, Nikaido, Marmelstein, Kubovcik & Murray

[57] ABSTRACT

A device for applying a viscous sealant (D) in annular form onto a substantially flat surface, specifically on to a can end (14) is provided with an approximately horizontal annular transfer surface (2a, 3a) provided at the free upper end of a material transfer head (1). A pass (4) opening towards the transfer surface (2a, 3a) is provided in the material transfer head (1) and is fed with sealant from a continuously operating pump device (P1). An open-top interior (8) surrounded by the transfer surface (2a, 3a) and provided in the material transfer head (1), which is connected to a backflow pipe (9) for excess sealant, is, in addition, permanently connected to a vacuum source (P2). Further, a transfer device (18) is provided by which the can end (14) is vertically movable in relation to the transfer surface (2a, 3a). (FIG. 1).

7 Claims, 2 Drawing Sheets

DEVICE FOR APPLYING A VISCOUS SEALANT IN ANNULAR FORM ONTO A SUBSTANTIALLY FLAT SURFACE, SPECIFICALLY TO A CAN END

The invention relates to a device for applying a viscous sealant in annular form onto a substantially flat surface, specifically to a can end, with an approximately horizontal annular transfer surface provided at the free upper end of a material transfer head, an outlet opening towards the transfer surface provided in the material transfer head, with this outlet being fed with sealant from a continuously operating pump, an open-top interior provided in the material transfer head and surrounded by the transfer surface which is connected to a backflow pipe for excess sealant, and with a transfer device by which means the can end is vertically movable in relation to the transfer surface.

A device of this kind is known from the DE-PS 24 21 315. The can end, to which the sealant shall be applied, has at least one hat-shaped opening tab, partially punched from the end leaving a hinge area, and a relative aperture formed by the partial punching. The opening tab and/or the area of the aperture surrounding the end have been cold formed so that the edge area of the aperture overlaps the edge area of the opening tab on the end outside. In order to seal the opening tab with regard to the end and to prevent unintended opening of the opening tab even under minor forces acting from outside, the sealant, normally plastisol, has to be applied to the edge areas of the opening tab and the aperture on the end inside. This sealant will subsequently be jellied under heat.

The operation of the device as known is such that the sealant is pumped continuously from below to the transfer surface, i.e. in an amount which is higher than that actually needed for producing the sealing ring. The excess amount of the material partly flows to the inside into the interior and, from there, through the backflow pipe into a reservoir and, partly, it flows along the outside of the material transfer head downwards into a collecting trough surrounding the transfer head and, from there, into the reservoir. In order to transfer the sealant in annular form to the edge areas of the tab and of the aperture, the can end, positioned horizontally with its inside turned downwards, is approached towards the transfer surface by means of the transfer device and, subsequently, lifted again off the transfer surface. By this operation, a greater amount of sealant is, so to speak, stamped on to the end inside in annular form. In lifting the can end off the transfer surface, first the sealant adhering to the end inside remains connected to the sealant existing on the transfer surface. During lifting the can end, a hose of sealant is formed which gets thinner and thinner with the increasing distance of the can end from the material transfer head and tears after a certain lifting distance which depends on the composition of the sealant. It has now been found that, when the hose tears off, the residual hose hanging from the applied sealing ring first closes into a hemispherical blister hanging downwards, at the deepest point of which a drop is formed. Eventually, the hemispherical blister blows up and, in blowing up, the material of the hemispherical blister splashes about. This splashed sealant does not only collect in the form of splashes on the end inside, but it may also contaminate the material transfer head, its surroundings and the subsequent stations. Since such contaminations will heavily accumulate at an application speed of 300 application per minute and more, these contaminations may lead to trouble and down-times. In addition, the sealant flowing off on the outside of the material transfer head may also cause trouble. In fact, this sealant is collected by a collecting trough surrounding the material transfer head in the form of a ring, with this trough being of a very shallow design and having little fall due to reasons of space. Therefore, the sealant, particularly if its flows off on the outside of the material transfer head in greater quantities, may lead to congestions in the collecting trough and to overflowing of the same.

Therefore, the invention is based on the task to provide a device for applying a viscous sealant in annular form on to a substantially flat surface, specifically to a can end of the type as mentioned in the beginning, permitting a splash-free application of the sealant and preventing congestions by the sealant in the collecting trough area as well as contaminations of the machine parts adjacent to the material transfer head.

According to the invention, this is achieved by the interior of the material transfer head being permanently connected to a vacuum source. Surprisingly enough, it has been found that, by this comparatively simple measure, the forming of a hemispherical blister on the end inside and resulting splashes of sealant are effectively prevented. The vacuum existing in the interior also extends to the inside of the sealant hose during lifting the can end off the transfer surface, resulting in the hose tearing off after a relatively short lifting distance without forming a hemispherical blister as described above. If, with the hose tearing off, droplets of sealant occurred, they would be sucked into the interior by the vacuum, thus preventing contamination of the machine parts surrounding the material transfer head and adjacent to it. In addition, by the permanent vacuum, the excess sealant continuously emerging from the transfer surface is specifically sucked into the interior. This will also eliminate excess material flowing off on the outside of the material transfer head and possible congestions by sealant in the collecting trough.

Advantageous designs of the invention are characterized in the sub-claims.

The invention will be explained in more detail in the following by way of example as shown in the drawing, in which.

Figure 1:
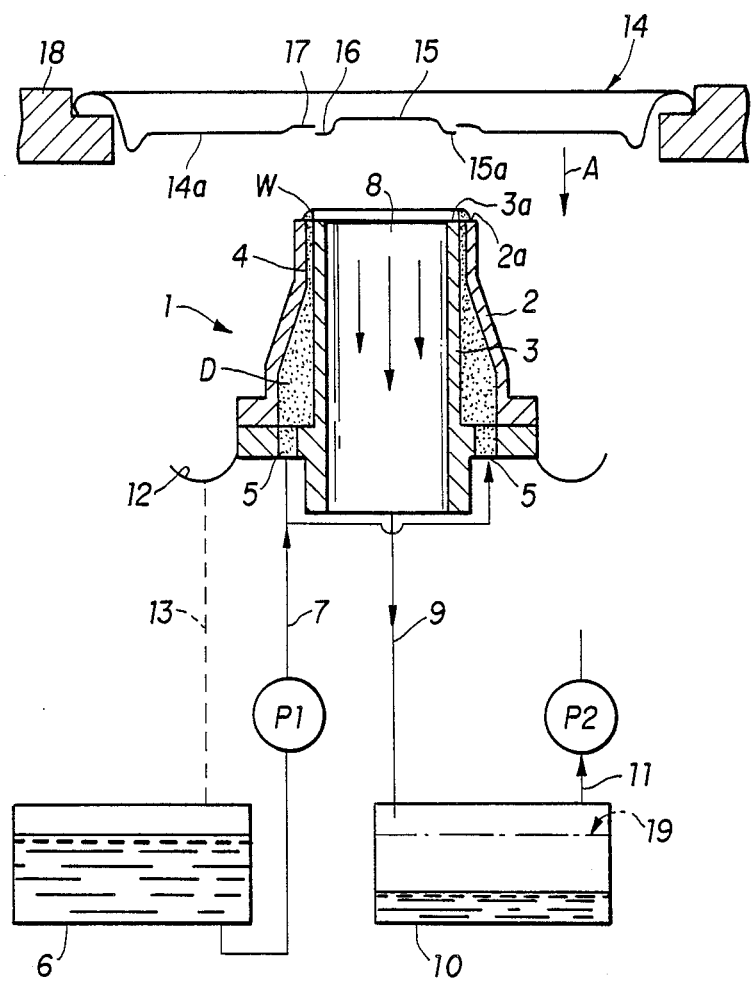
FIG. 1 shows an axial section of the material transfer head with can end and transfer device in the starting position.

The material transfer head 1 substantially consists of an outer sleeve 2 with an annular cross section expanding slightly in a downward direction and an inner pipe 3 arranged concentrically in relation to the outer sleeve 2 and spaced apart therefrom. Between the two parts 2, 3, an annular material passage is formed. The upper mouths 2a and 3a of the outer sleeve 2 and of the inner pipe 3 together form the transfer surface. The material passage 4 is open towards the transfer surface 2a, 3a and connected at the bottom thereof by means of pass bores 5. As shown schematically in FIG. 1, the pass bores 5 are supplied with sealant via a supply line 7 through a pump P1 taking sealant such as plastisol from a reservoir 6. Pump P1 operates continuously and continuously presses sealant through the annular passage 4 to the annular transfer surface 2a, 3a.

The inner pipe 3 comprises an open-top interior 8. Further, the inner pipe 3 is connected to a reservoir 10 through a backflow pipe 9. A vacuum pipe 11 connected to a vacuum pump P2 is connected to the reservoir, with the pipe ending into the reservoir 10 above the highest possible material level 19 marked in the drawing by dash-dotted lines.

In order to ensure that the vacuum produced in the reservoir 10 continues through the backflow pipe 9 up to the upper end of the inner pipe 3, i.e. up to interior 8, the cross section of the interior and that of the backflow pipe 9 will usefully be substantially larger than the cross section of the sealant flowing back through interior 8 and backflow pipe 9.

Further, the material transfer head 1 is surrounded by a collecting trough 12 serving for collecting sealant possibly flowing off down the outside of outer sleeve 2. The collecting trough 12 is connected to reservoir 6 or to another reservoir not shown or, if necessary, also to reservoir 10 through a backflow pipe 13.

Figure 2:
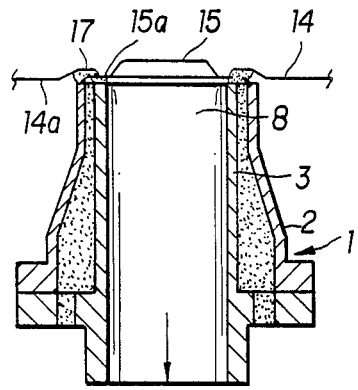
FIG. 2 shows the material transfer head and the can end in the transferring position.
Figure 3:
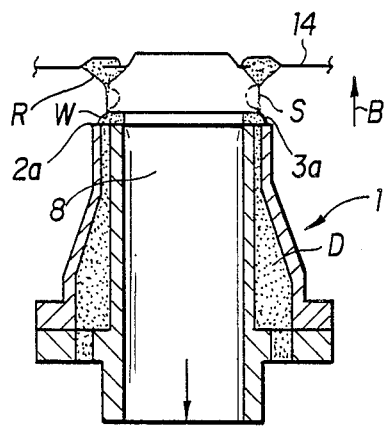
FIG. 3 shows the material transfer head and the can end in an intermediate position after material transfer.
Figure 4:
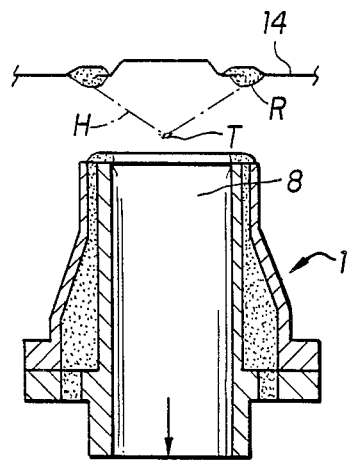
FIG. 4 shows the material transfer head and the can end in the final position.

Further, FIG. 1 shows a can end 14 with at least one—normally there are two—hat-shaped opening tab 15. This opening tab 15 has been punched from can end 14 leaving a hinge area, thus forming an aperture 16. Opening tab 15 and/or the area of the end surrounding the aperture have been cold formed so that the edge area 17 of aperture 16 overlaps edge area 15a of the opening tab on the end outside. For sealing opening tab 15 with regard to end 14, sealant shall be applied in the form of a ring to the edge areas 15a, 17 from the end inside 14a, i.e. from below. To this purpose, a transfer device 18 is provided holding the end, moving it towards transfer head 1 and removing it again from transfer head 1 after having transferred the ring of sealant. The operation of the device is as follows: Through pump P1, sealant D is continuously pumped from the bottom through passage 4 of the material transfer head 1 to its transfer surface 2a, 3a. The amount of sealant supplied hereby is higher than that actually needed to produce the sealing ring. By means of pump P2, a vacuum is permanently produced in the reservoir 10 which continues via the backflow pipe 9 up to interior 8. According to experience, the vacuum in the reservoir 10 should be about—0.1 bar, measured with closed interior 8. However, normally, interior 8 is open, and the vacuum in the interior will produce an air current directed towards the bottom, as shown by the arrows. By this air current, the sealant escaping from the material pass at the top of the transfer surface 2a, 3a is sucked specifically into the interior 8 and fed back to the reservoir 10 via backflow pipe 9. Owing to this, sealant will no longer flow down the outer sleeve 2 or only flow in minor quantities. Whereas now sealant emerges continuously from the transfer surface 2a, 3a and, there, forms an annular ridge W of sealant, end 14 is lowered in the direction A by means of the transfer device 18. The downward movement of the transfer device 18 is stopped by a stop not shown so that the can end, as shown in FIG. 2, becomes positioned within a minor distance above the transfer surface 2a, 3a. Hereby, a major part of the annular sealant ridge W is transferred to edge areas 15a, 17 of can end 14. Subsequently, the transfer device 18 moves upwards again in the direction B, with the can end 14 being removed from the material transfer head 1. In lifting the can end 14 from the transfer surface 2a, 3a, the sealant R adhering to the can inside in annular form will first remain connected to the sealant ridge W on the transfer surface 2a, 2b. During lifting can end 14, a hose S of sealant will form. The vacuum existing in the reservoir 10 and also in the interior 8 will propagate to the interior of hose S, whereby the walls of hose S will be pulled inside and torn. This tearing of the sealant hose S will happen already after a very short lifting distance in the direction B. Any hose remains forming droplets of sealant will be sucked immediately into interior 8 by the vacuum. Consequently, they cannot get to the lower surface of end 14a and collect there. Simultaneously, droplets of sealant will be prevented from falling down outside of material transfer head 1. The material transfer head 1 and other adjacent machine parts will, therefore, stay clean. Without using a vacuum, hose S would not tear before a longer lifting distance. Any residual hose having remained on the lower end surface would then, as shown in FIG. 4 by a dash-dotted line, form a hemispherical blister H starting from the sealant ring R, at the lowest point of which a drop T of sealant would collect. In the subsequent blowing up of the hemispherical blister H, droplets of sealant will form which will partly fall down and then contaminate the material transfer head or, in the case of the can end 14 moving onwards, also adjacent machine parts. In addition, some of the drops would collected on the end inside 14a. By using a vacuum, however, the sealant hose S will, as explained above in more detail, already be torn very early and, thus, the formation of the hemispherical blister H as described will be avoided. In order to reliably prevent overflowing of sealant on the outside of outer sleeeve 2, the material transfer head 1 may be usefully designed so that the upper mouth 2a of outer sleeve 2, with regard to mouth 3a of the inner pipe, will protrude upwards by a few hundredth of a millimeter, preferably by about 0.05 mm. By this measure, supported by the vacuum permanently effective in interior 8, overflowing of sealant on the outside of outer sleeve 2 will be reliably prevented. In the example as described above, a ring of sealant is applied which, along its total circumference, is substantially of the same time width and thickness. However, with brittle sealant material, it may be useful for increasing the flexibility of the ring that the ring of sealant have a larger width and/or thickness at the part of the opening tab opposite to the hinge area, as, at this point, the sealant ring will be under maximum stress due to the inside pressure in the can, which, especially during pasteurization, in comparatively high.

I claim:

1. A device for applying viscous sealant in annular form onto a substantially flat surface, and specifically onto a can end, said device comprising:

a material transfer head having an annular transfer surface provided at a free upper end thereof, including an annular passage opening toward said annular transfer surface, such that the sealant flows through said annular passage to said annular transfer surface, and wherein an open-top interior is formed in the interior of said annular transfer surface;

a pump means for continuously pumping the sealant into said material transfer head;

a backflow pipe connected to said open-top interior for removing excess sealant therefrom;

a transfer means for moving said can end vertically up and down with respect to said annular transfer surface; and a vacuum source operatively coupled to said open-top interior for maintaining a suction in said open-top interior.

2. The device of claim 1, wherein said vacuum source is connected to said open-top interior by way of said backflow pipe.

3. The device of either one of claim 1 or 2, wherein said backflow pipe feeds into a reservoir and a cross-section of the interior of said backflow pipe is substantially larger than the cross-section of the sealant flowing back into the reservoir, and further wherein said vacuum source is connected to said reservoir by way of a vacuum pipe which connects to said reservoir at a point above the highest possible material level of sealant in the reservoir.

4. The device of claim 3, wherein the vacuum in said reservoir is substantially 0.1bar.

5. The device of claim 1, wherein said material transfer head comprises:
   an inner pipe;
   an outer sleeve, concentric with said inner pipe and spaced apart therefrom, such that said annular passage is formed therebetween, and said open-top interior is formed inside of said inner pipe.

6. The device of claim 5, wherein an upper opening of said outer sleeve extends upwardly beyond an upper opening of said inner pipe.

7. The device of claim 6, wherein said upper opening of said outer sleeve extends upwardly about 0.5 mm beyond said upper opening of said inner pipe.

* * * * *